Sept. 1, 1959 K. E. HUMBERT, JR 2,902,163
FILTER STRUCTURE
Filed Jan. 11, 1955 2 Sheets-Sheet 1
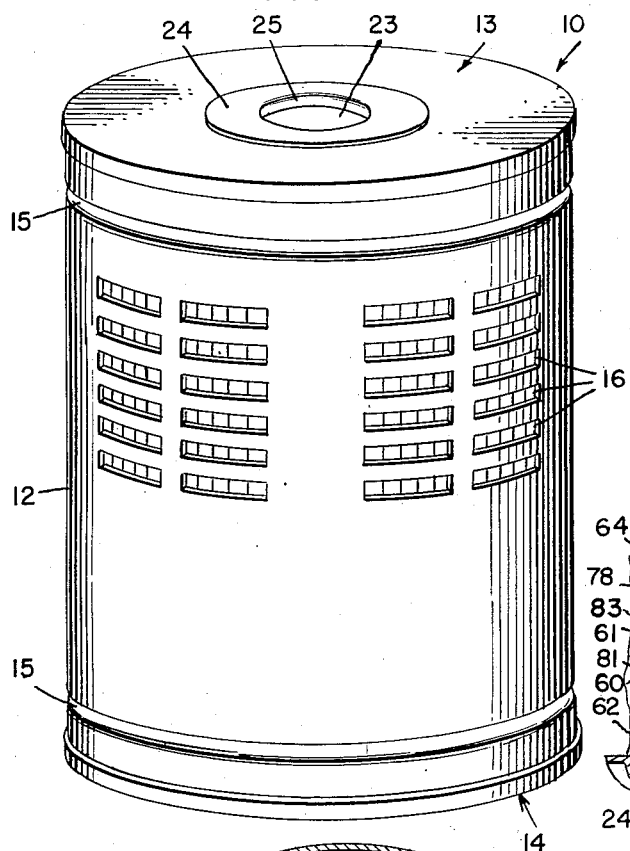
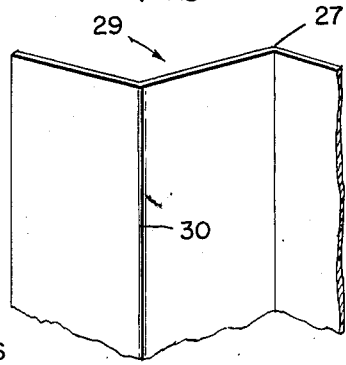
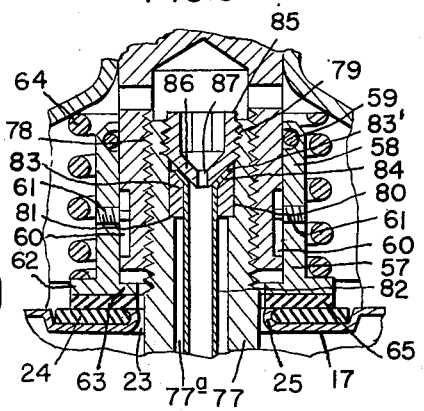
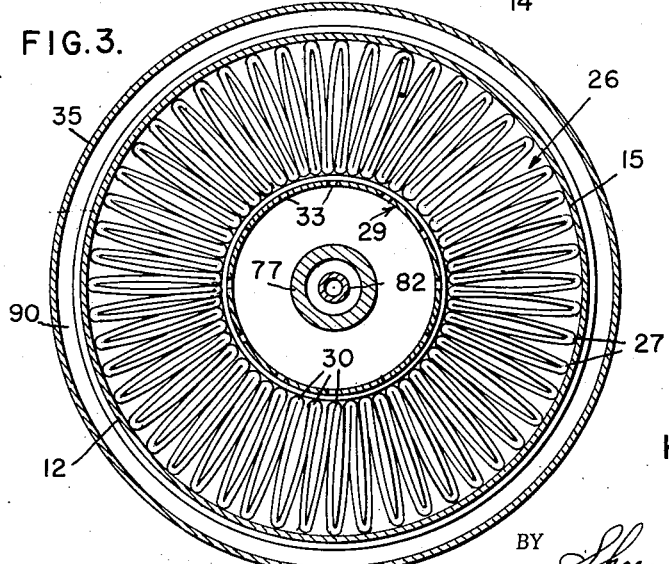
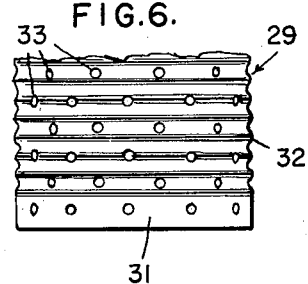
INVENTORS
Kingsley E. Humbert, Jr.
BY *Shoemaker & Mattare*
ATTORNEYS Sept. 1, 1959     K. E. HUMBERT, JR     2,902,163
FILTER STRUCTURE
Filed Jan. 11, 1955                           2 Sheets-Sheet 2
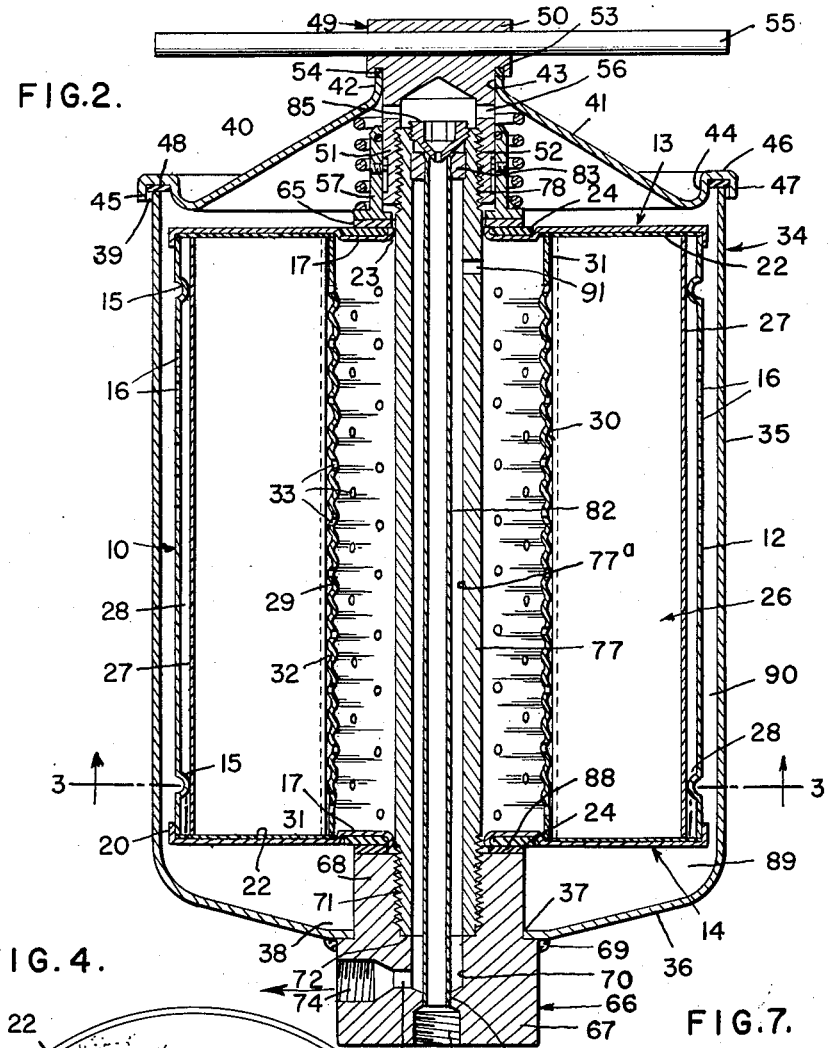
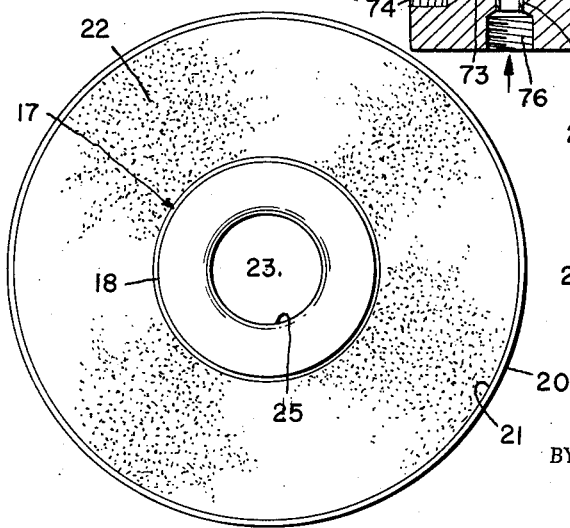
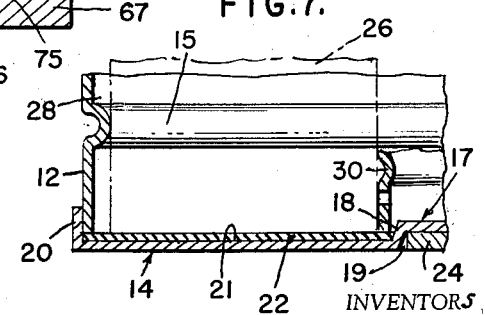
INVENTOR,
Kingsley E. Humbert, Jr.
BY *Shoemaker & Mattare*
ATTORNEYS

United States Patent Office 2,902,163
Patented Sept. 1, 1959

2,902,163

FILTER STRUCTURE

Kingsley E. Humbert, Jr., Gastonia, N.C., assignor to Wix Corporation, Gastonia, N.C., a corporation of North Carolina Application January 11, 1955, Serial No. 481,065

6 Claims. (Cl. 210—440)

This invention relates generally to the class of filters and is directed particularly to an improved filtering structure comprising a new replaceable filter unit or cartridge and to an improved shell or housing structure for the same.

The replaceable filter unit or cartridge forming a unit of the present invention is of the type wherein the filter element is in the form of a pleated annular body of filter paper, or other suitable filter sheet material, of substantial length enclosed in a can of metal or other suitable material and adapted to be placed in a shell or housing into which the liquid to be filtered is run to pass through the replaceable unit or cartridge and out in clean condition for reuse, leaving impurities behind in the shell. In cartridges of the kind referred to, the free circulation around the filter element of the liquid to be filtered, of whatever type it may be, whether lubricating oil, cooking oil or a non-oily liquid, is restricted by reason of the fact that the outer folds of the pleated unit are in engagement with the wall of the enclosing can. It is, accordingly, an object of the present invention to provide a new and improved form of cartridge construction wherein the pleated filter element is maintained in spaced relation with the wall of the enclosing can whereby the liquid to be filtered may circulate freely around the element as well as flow radially in the can through the element to thereby maintain a more uniform passage of the liquid through the numerous pleats or folds of the element.

Filters of the type to which the present invention relates are designed for use in high pressure systems and the filter element is therefore subjected to heavy pressure in the passage of the liquid therethrough and it is accordingly another object of the invention to provide, in association with a pleated annular element of the character stated, a centrally positioned support or stiffening means designed in a novel manner to maintain the annular filter element against collapse when subjected to pressure while at the same time not interfering with the free flow of the filtered liquid to the filter outlet.

Another object of the invention is to provide a novel filter cartridge housing shell having concentric inflow and outflow tubes or pipes wherein a new and novel means is provided for securing such tubes or pipes in desired assembled relation.

Still another object of the invention is to provide a shell or housing for a filter cartridge of the character set forth, wherein concentric inflow and outflow tubes or pipes extend axially through the shell to be received in the tubular center of and pass through the cartridge, with a novel flow restrictor means connecting the tubes at the end of inflow tube which discharges into the shell.

A further object of the invention is to provide a shell or housing for a filter cartridge of the type having a central passage, wherein such shell or housing has bottom inflow and outflow ports and concentric inflow and outflow tubes or pipes respectively connected with such ports and extending through the shell or housing and terminating at their other ends in the top part thereof, for extension through said passage of the filter cartridge, with a flow restrictor nut threaded in the said other end of the outflow tube and engaging the adjacent end of this inflow tube and retaining the latter in place.

Yet another object of the invention is to provide, in a structure of the character set forth in the preceding paragraph, a means for suspending the inflow tube in position in the outflow tube, with said flow restrictor nut having a hollow form and a conical downward extension engaged in the said adjacent end of the inflow tube, and having a flow restricting aperture in the tip or apex of such extension.

The replaceable cartridge of the form above referred to is adapted to be enclosed in a shell or housing and it is an object of the invention to provide a shell or housing of new and novel construction for such a replaceable filter cartridge, wherein such shell and cartridge in combination provide a new filter structure providing a sump or trap which functions to collect contaminants by a process of sedimentation and which function is augmented by the novel construction of the filter element encasing can be providing inlet openings in the wall of the can in the upper part only thereof and also providing filtered liquid exhaust ports communicating only with the upper part of the center of the cartridge.

A still further object of the invention is to provide an improved replaceable cartridge encasing shell which has a single cover attaching means so designed as to exert axial pressure on an end face of the filter cartridge to effect a seal between the contaminated fluid and the filtered fluid.

Another object of the invention is to provide in a filter designed particularly for motor vehicle use, concentric inlet and outlet passages communicating respectively with the upper part of the filter unit enclosing shell and the interior of the replaceable cartridge whereby a positive means is had for maintaining the filter shell substantially filled with oil and eliminating the possibility of drain-back and resultant crank case or sump overloading.

Yet another object is to provide an improved filter having concentric inlet and outlet tubes passing axially through the replaceable filter cartridge, with the inlet tube inside the outlet tube and terminating above the top end of the cartridge vertically mounted in the housing shell, thereby preventing drain-back and providing heat transfer between the inflowing unfiltered oil and the outflowing filtered oil whereby to accelerate the rapidity with which the filter reaches proper operating flow rate in cold weather.

The means whereby the foregoing and other objects may be attained will become apparent from the following detailed description taken in association with the accompanying drawings forming a part of the specification with the understanding, however, that the invention may be changed or modified so long as such changes or modifications do not depart from the salient features of the invention as expressed in the appended claims.

In the drawings:

Fig. 1 is a view in perspective of a replaceable filter unit or cartridge constructed in accordance with the present invention.

Fig. 2 is a view in vertical longitudinal section of the replaceable cartridge unit and the novel encasing shell or housing therefor.

Fig. 3 is a horizontal section taken substantially on the line 3—3 of Fig. 2 but showing the pleats of the filter element in end elevation.

Fig. 4 is a view looking toward the inner face of an end wall of the cartridge.

Fig. 5 illustrates a portion of the pleated filter paper element showing the manner of folding the same.

Fig. 6 is an elevational view of a portion of one end of the annular filter element reinforcing tube.

Fig. 7 is a sectional detail on an enlarged scale through a portion of the side wall and an end wall of the filter element enclosing can.

Fig. 8 is a sectional detail upon an enlarged scale of the locking nut and parts immediately associated therewith.

Referring now more particularly to the drawings, the description will first be directed to the replaceable unit or cartridge per se.

The cartridge shown in Fig. 1 is generally designated 10 and comprises a filter element encasing can of cylindrical form having a side wall 12 and upper and lower end walls 13 and 14 respectively.

The side wall 12 is provided adjacent its upper and lower ends with an in-pressed encircling bead or rib 15 which, as shown most clearly in Fig. 7, projects substantially into the can beyond the inner side of the wall 12, for the purpose hereinafter set forth.

The wall 12 of the can is also provided in the upper half portion thereof with a number of liquid admission openings or ports 16. While these ports may be of any desired form and in any suitable arrangement, it is preferred that they be of elongate rectangular outline with the length directed in a circumferential direction and arranged or assembled in groups as illustrated in Fig. 1. By this arrangement, ample provision is made for the admission of oil or other liquid into the unit without materially weakening the wall since the groups of ports or openings are separated by a substantial width of wall structure.

The end walls 13 and 14 of the cartridge are preferably formed of metal like the side wall 12 and the material is of uniform thickness throughout, as shown.

These walls are of duplicate form and therefore description of one will apply to the other and the same reference characters will be employed in connection with each of the walls. Each end wall has a central in-pressed circular area 17 which provides on the inner side the circular shoulder 18 and on the outer side the circular recess or depression 19.

The outer portion or periphery of each end wall has the encircling flange 20 which, when the wall is in position to close an end of the can, engages around the outer side of the side wall 12 as shown in Fig. 2. By the formation of the in-pressed area 17 providing the circular inside shoulder 18 and the flange 20, there is formed an annular channel 21 in which is placed a layer of adhesive 22 for the purpose hereinafter set forth.

The center of each of the end walls, and therefore the center of the in-pressed area 17 thereof, is provided with an opening 23 through which the hereinafter described tubes of the cartridge encasing shell pass.

Disposed within the annular recess 19 of each end wall is an annular sealing gasket 24, the thickness of which approximates the depth of the recess 19 in which it is located, and the opening of the gasket is slightly larger than the opening 23 through the wall and the edge of the wall opening is turned in to form a locking flange 25 which engages across the edge of the gasket opening as shown in Fig. 8.

The numeral 26 generally designates the filter element which is housed in the can. This filter element is of the pleated annular form illustrated in Fig. 3 and has a length approximating the inside length of the can as shown in Fig. 2, or may be a fraction longer to insure firm contact between the ends of the pleats of the element and the end walls when applied, whereby desired positive bonding between the pleats and end walls by the adhesive will be assured. The filter element has an overall diameter approximating the inside diameter of the annular beads 15 while the central passage through the filter element has a diameter slightly greater than the diameter of the circular ribs 18 of the end walls. Accordingly it will be seen that when the pleated annular filter element is in position in the can, the outer folded edges 27 of the pleats will contact the ribs or beads and there will thus be formed a narrow oil circulating space around the filter element within the can as indicated at 28.

Adapted to position centrally in the can of the cartridge unit is a reinforcing tube or cylinder which is generally designated 29, the inside diameter of which approximates the diameter of the inwardly projecting annular shoulders 18 of the end walls while the overall outside diameter of this cylinder is approximately the same as the diameter of the central passage through the filter element which is defined by the inner fold edges 30 of the filter element pleats.

Portions of the two ends of the cylinder 29 are straight as indicated at 31 and between these straight end portions, the cylinder is circumferentially corrugated as indicated at 32 and is also provided throughout its length with a multiplicity of passages or openings 33 which permit the movement of oil or other liquid being filtered from the area 28 through the material of the filter element and into the center of the cylinder 29 to be withdrawn through outlet tubes of the cartridge and casing shell as hereinafter set forth.

As hereinbefore stated, the filter material of a replaceable cartridge of the character herein described is subjected to considerable pressure and the cylinder 29 functions to maintain the element against collapse under such pressure and it also assists in maintaining the element properly centered in the encasing can.

In order to prevent the bypassing of liquid around or across the ends of the pleated filter element 26, the adhesive 22 is provided and in assembling the cartridge, when the end walls are applied and pressed against the pleat ends, the end edges of the pleats of the filter element will be pressed firmly into the adhesive, as hereinbefore stated, and caused to be bonded to the end walls, thereby effecting a tight metal-to-paper seal between the end walls of the cartridge can and the ends of the pleated filter element.

The filter element 26 may be formed of suitable filter paper or any other sheet filter material which can be folded into annular pleated form.

The adhesive 22 may also be of any suitable character which will be unaffected by the liquid passing through the filter cartridge, such adhesive being, for example, of a suitable thermo-setting plastic resin or the like.

Fig. 2 illustrates in longitudinal section a novel shell or housing construction in which the present filter cartridge is designed to be used. The filter cartridge and housing are designed for efficient functioning in cooperative relation one with the other, but the cartridge is of novel construction in itself and may be used in other suitable types of shells or housings where it is adaptable and the housing may be employed with other cartridges suitably constructed for the purpose.

The filter shell or housing is generally designated 34 and comprises the circular wall body 35 which has the inwardly and downwardly sloping bottom wall 36 formed integrally therewith as shown and which bottom wall has a central opening 37 therethrough defined by a narrow flat portion 38. The top end of the housing is defined by the circular wall edge 39 and is closed by the removable cover or lid which is generally designated 40.

The cover or lid 40 has a substantially frusto-conical wall portion 41 which, at its top, is defined by the circular upwardly directed flange 42 which defines an opening 43 through the top of the cover.

The bottom edge of the frusto-conical wall 41 has a low, upturned flange portion 44 which forms one side of an encircling downwardly opening channel 45 which, in addition to the flange 44 which forms the inner side of the channel, has the horizontal bottom forming portion 46 and the outer encircling terminal flange portion 47. This channel 45 is of proper dimensions to receive the top edge 39 of the shell wall and within the channel is located a suitable gasket 48 which bears upon the edge 45 of the shell wall when the cover or lid is in position.

The cover 40 is held or secured in position by a nut 49 which is of elongate form having the head portion 50 and the inwardly, axially extending skirt portion 51 which is internally screw threaded as indicated at 52. The outside diameter of the skirt portion 51 is approximately the same as the inside diameter of the flange 42 through which it extends and in which it is designed to turn or rotate, and where the head and skirt 50 and 51 are joined, there is provided a downwardly directed channel 53 in which a gasket 54 is housed for sealing contact with the top edge of the flange 42.

Extending transversely through the head 50 of the nut is a bar handle 55 by which the turning of the nut is effected.

The upper end portion of the skirt portion 51 is provided with inlet ports 56 through which inflowing oil passes from the interior of the skirt into the upper part of the shell in the manner hereinafter described.

Encircling the skirt portion 51 of the nut and disposed below the inlet ports 56 is a sealing or clamping collar 57. Adjacent its upper end, the collar 57 is provided with internal groove 58 in which is housed a sealing ring 59 which snugly encircles the skirt 51.

The lower portion of the skirt 51 is provided with at least two oppositely located, short, longitudinal grooves 60 in the outer wall surface and the collar 57 carries two inwardly extending guide pins 61, the inner ends of which slidably engage each in an annular groove 60 thereby permitting limited longitudinal movement of the collar on the skirt.

The lower end of the collar 57 has the outer encircling flange 62 and an internal flange 63, and encircling the collar is a coil expansion spring 64, the upper end of which bears against the underside of the wall 41 while the lower end rests or bears upon the flange 62 of the collar. This spring normally resists upward or outward movement of the collar on the skirt to function in maintaining the removable cartridge in desired position in the shell in the manner hereinafter described.

The flanges 62 and 63 form a relatively broad annular foot against which is secured a washer 65, the function of which will hereinafter be made apparent.

The numeral 66 designates a combined plug and tube carrier which is fixed to the bottom wall 36 of the shell. This body, which will be referred to generally as a plug, has a lower head portion 67 and an upper or inner extension 68 of reduced diameter which passes snugly through the opening 37 and the head portion is welded to the bottom wall 36 as indicated at 69 or other suitable means is provided for retaining the plug in position to seal the opening 37.

Formed axially in the reduced portion 68 of the plug 66 is a bore 70, which through a portion of its length from the upper or inner end of the reduced portion 68 of the plug is of enlarged diameter and is screw threaded as indicated at 71. The formation of the bore 70 in the two diameters shown provides a shoulder 72 and below or outwardly of this shoulder there is formed the radially directed port 73, the outer portion of which is screw threaded as indicated at 74 while at the bottom end of the bore 70 there is formed through the plug the downwardly opening port 75 which is screw threaded at the outer portion as indicated at 76.

The port 75 constitutes an inlet port for liquid entering the filter and the port 73 forms an outlet port for the filter liquid.

Threaded into the bore 70 is an end of an outlet tube 77 which is of a length to extend centrally entirely through the shell body, and the upper end of this tube is externally threaded as at 78 for engagement with the threads 52 in the skirt 51 of the securing nut 49. The tube 77 is also internally screw threaded at its upper end as indicated at 79 and for a short extent below the internal threads 79 the bore 77a of the tube is slightly increased in diameter as indicated at 80 forming a narrow shoulder 81.

Extending through the tube 77 is an inlet tube 82, the outside diameter of which is materially less than the diameter of the bore 77a and the lower end of this inlet tube 82 extends into and tightly fits the inner end of the port 75 as illustrated.

Encircling and secured to the upper end of the inlet tube 82 is a collar 83 which fits in the portion 80 of an enlarged diameter of the bore 77a and rests upon the shoulder 81. The upper end of this collar 83 and the edge of the tube 82 extending thereinto are internally tapered to form a conical seat 84, the upper end of which is located slightly below the screw threads 79.

Threaded into the upper end of the tube 77 in engagement with the threads 79 is a hollow nut 85, the upper end of which opens into the inside upper end portion of the skirt 51 while the lower end of this nut is of conical form as indicated at 86 and adapted to press against the tapered seat 84 of the collar 83. Also, the tapered lower end of this hollow nut has a small fluid flow restricting passage 87 which opens into the inlet tube 82 as illustrated.

As illustrated, the upper end portion of the interior of the skirt communicates with the inner tube 82 through the passage 87 and with the lateral ports 56 leading into the upper part of the shell.

The overall outside diameter of the replaceable filter unit or cartridge 10 is slightly less than the inside diameter of the shell 35, as shown in Fig. 2, and the openings 23 through the end walls of the cartridge are of approximately the same diameter as the outside diameter of the outlet tube 77. Accordingly, it will be seen that when the cartridge is installed in the shell, it will be slid down over the tube 77 and the sealing gasket 24 carried by the bottom wall 14 will be supported upon the inner end of the portion 68 of the plug 66. It is preferred that there be interposed between the gasket and the said end of the plug a washer 88 although this is not essential.

When the cartridge is in position in the shell, the portion 68 of the plug 66 maintains the bottom wall of the cartridge a substantial distance above the bottom wall 36 thus providing a relatively deep sump 89 and the spacing of the cartridge from the shell wall provides an area 90 around the cartridge through which the oil or other liquid may circulate.

After the installation of the cartridge in the shell, the threaded upper end of the outlet tube 77 will be extended slightly above the top of the cartridge so that when the cover 40 is pressed in position on the top edge 39 of the shell, this threaded upper end of the tube 77 will be engageable in the skirt with the internal threads 52.

When the cover 40 is first placed on the shell after installing the cartridge, the foot portion of the collar, which is provided by the flanges 62 and 63, will first engage against the gasket 24 of the top wall 13 and downward pressure will then have to be applied to the cover to force the same down against the edge 39 of the shell wall against the resistance of the spring 64. Thus, in the initial placement of the cover on the shell, the cartridge will be pressed firmly downwardly onto the washer 88 supported on the upper end of the extension 68 of the plug 66 in the bottom of the shell and thereby form a somewhat tight seal with the inner end of the plug and as the nut 49 is rotated by the handle bar 55, it will thread inwardly on the upper end of the outlet tube 77 and force the cover down into shell closing position thus further compressing the spring to increase the fluid tight coupling at the bottom and to also produce a fluid tight coupling at the top between the washer 65 on the bottom of the collar and the sealing gasket 24 in the top wall 13 of the cartridge.

When the filter of the present invention is connected with the fluid lines by which fluid to be filtered is directed into the cartridge and drawn off therefrom, the contaminated or unfiltered fluid, such as motor oil for example, will enter through the tube or pipe 88 and pass through the interior portion of the skirt 51, through the ports 56 and into the top of the shell, flowing downwardly therein around the cartridge. Before any material amount of the inflowing liquid enters the cartridge, the sump 89 and lower half of the shell will be filled to the level of the lowermost openings 16 of the cartridge. The fluid will then flow into the cartridge as it rises above the openings 16 and, as previously pointed out, can flow freely around the filter element within the can by reason of the spacing of the element from the inner wall of the can by the ribs or beads 15. The fluid then will pass through the filter element and through the apertures 33 into the central cylinder 29 but will not flow out of the filter until the level reaches near the top of the cartridge where the outflow tube 77 is provided with one or more wall ports 91.

It will be seen from the foregoing that there is provided by the present invention a new and novel replaceable filter unit or cartridge wherein a more uniform distribution of the contaminated liquid around the filter element is obtained by reason of the spacing provided between the can wall and the filter element by the beads 15 and there is also provided a much stronger interior construction for the filter element without sacrificing any of the advantages of free flow of liquid therethrough, by the corrugated and perforated supporting or reinforcing cylinder 29 which lines the inner portion of the pleated annulus.

In addition to the foregoing, by the provision of a cartridge in which the fluid admission ports or openings 16 are in the upper portion or adjacent to the upper end of the cartridge, a substantial stand of liquid is had in the shell so that efficient removal of contaminants from the liquid by precipitation is obtained, such contaminants being collected in the relatively deep sump 89 below the cartridge.

In addition to the foregoing advantages of the central tube or cylinder 29 in the cartridge, such tube functions to transmit the heavy axial pressure applied to the top of the cartridge when the locking nut is threaded in, to the bottom wall of the cartridge to effect the desired and very necessary tight seal whereby to prevent the escape of filtered liquid from within the cartridge into the shell and vice versa.

A further and important advantage of the present filter construction is in the coaxial arrangement of the inflow and outflow tubes 82 and 77 respectively whereby there is obtained heat transfer between the inflowing unfiltered liquid, such as oil or the like, and the outflowing filtered liquid so that in cold weather, the filter reaches its proper operating flow rate rapidly.

Another novel feature of the present filter construction resides in the manner in which the tubes 77 and 82 are assembled which provides for easy and quick separation of the parts for replacement or cleaning if and when necessary and also in the construction whereby the need for tools in replacing the filter cartridge is eliminated.

I claim:

1. In a filter, a filter cartridge receiving housing having a circular side wall and a bottom wall, a cover adapted to close the top of the housing, a body secured in and centrally of the bottom wall, said body having two ports opening to the atmosphere, a pair of concentric tubes, means joining each of said tubes at one end to the body with each tube being in communication with one port, said tubes extending axially through the housing, the outer tube forming a filtered liquid outlet and the inner tube forming an unfiltered liquid inlet, means coupling the other end of the inner tube with and sealing it to the outer tube inwardly of and closing said other end of the outer tube, the said other end of the inner tube having an outlet for discharging unfiltered liquid into the housing, means forming a liquid flow restrictor in the said outlet of the inner tube, and said outer tube having a wall port located inwardly from the said other end thereof to receive liquid after passing through the filter cartridge.

2. The invention according to claim 1, wherein the said means coupling the other end of the inner tube with the other end of the outer tube comprises a collar around the inner tube inserted in and spaced from said other end of the outer tube and supported below said other end thereof, and said flow restrictor embodying a hollow nut threaded into the said other end of the outer tube and imposing pressure against and retaining the collar in position therein, and said nut having a liquid flow passage axially therethrough and communicating with the inner tube.

3. A filter comprising a housing, a filter cartridge therein including a cylinder closed at its ends and a filter unit therein, the cartridge having an axial passage therethrough and fluid passing ports in the cylinder, fluid inlet and outlet means comprising concentric conduits secured to and each opening at one end through the bottom of the housing and extending through said axial passage to and terminating in the top portion of the housing, one of said conduits opening at its other end into the housing above the cartridge and the other conduit communicating only with the axial passage of the cartridge, said one of the conduits providing a fluid inlet and the other conduit providing a fluid outlet, the said other conduit extending at said other end thereof beyond the adjacent end of the said one of the conduits, and a hollow nut threaded into the said extended end of said other conduit and having a tapering apertured extension projecting into the adjacent end of the said one of the conduits and having the tapering extension thereof pressing against said end and maintaining the said one of the conduits in working position.

4. A shell designed to enclose a filter cartridge of the type having a center passage therethrough, said shell having a bottom and a removable top, a body secured in the center of said bottom and having a bore opening upwardly into the shell, the bore having a lower end portion of reduced diameter leading into a downwardly opening fluid inlet port, the body having a fluid outlet port outside of the shell and communicating with the bore above the portion of reduced diameter, a fluid discharge pipe having one end threaded in the upper end of said bore and extending upwardly and terminating adjacent to said removable top, means detachably coupling said top with the upper end of said pipe, a fluid inflow pipe of smaller outside diameter than the inside diameter of the discharge pipe, said inflow pipe being positioned within the discharge pipe and having a lower end frictionally secured in the portion of the bore of reduced diameter, said inflow pipe being insertable into and removable from the discharge pipe through the top end of the latter, the discharge pipe being internally threaded at its top end, a nut threaded into and closing the top end of the discharge pipe and bearing upon the top end of the inflow pipe and retaining the latter in position, the nut having a passage therethrough for flow of fluid from the inflow pipe into the shell, and said discharge pipe having a wall port a substantial distance below the top end of the inflow pipe through which to receive fluid for passage out of the shell.

5. The invention according to claim 4, wherein said discharge pipe is formed below the top end of the inflow pipe to provide an internal shoulder, and a collar secured to and about the top end of said inflow pipe and resting upon and pressed against said shoulder by said nut.

6. The invention according to claim 4, wherein said nut is hollow and has a downwardly tapering hollow extension which enters the adjacent end of the inflow tube to bear thereupon, the said extension having an opening through the end thereof, the opening, hollow extension and hollow nut providing the said passage.

References Cited in the file of this patent

UNITED STATES PATENTS

| | | |
|---|---|---|
| 1,913,401 | Liddell | June 13, 1933 |
| 2,218,800 | Williams | Oct. 22, 1940 |
| 2,533,266 | Kovacs et al. | Dec. 12, 1950 |
| 2,605,904 | Ogilvie | Aug. 5, 1952 |
| 2,606,628 | Hasselwander | Aug. 12, 1952 |
| 2,661,846 | Lash et al. | Dec. 8, 1953 |
| 2,680,521 | Kamrath | June 8, 1954 |
| 2,685,371 | Gretzinger | Aug. 3, 1954 |